US012602517B2

(12) United States Patent
Pistoia et al.

(10) Patent No.: US 12,602,517 B2
(45) Date of Patent: Apr. 14, 2026

(54) SYSTEMS AND METHODS FOR AUTOMATIC REDACTION OF SENSITIVE INFORMATION FROM VIDEO STREAMS

(71) Applicant: JPMORGAN CHASE BANK, N.A., New York, NY (US)

(72) Inventors: Marco Pistoia, Amawalk, NY (US); William Moriarty, West Chester, PA (US); Hargun Kalsi, Monmouth Junction, NJ (US); Matthew Murphy, Wigan (GB); Shaohan Hu, Yorktown Heights, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 310 days.

(21) Appl. No.: 17/504,275

(22) Filed: Oct. 18, 2021

(65) Prior Publication Data

US 2023/0120993 A1 Apr. 20, 2023

(51) Int. Cl.
| | |
|---|---|
| *H04N 7/18* | (2006.01) |
| *G06F 21/64* | (2013.01) |
| *G06K 19/06* | (2006.01) |
| *G06K 19/07* | (2006.01) |

(52) U.S. Cl.
CPC ....... *G06F 21/64* (2013.01); *G06K 19/06037* (2013.01); *G06K 19/0723* (2013.01); *H04N 7/183* (2013.01)

(58) Field of Classification Search
CPC ................ G06F 21/64; G06F 21/6245; G06K 19/06037; G06K 19/0723; H04N 7/183; H04N 7/18
See application file for complete search history.

(56) References Cited

U.S. PATENT DOCUMENTS

| | | | | |
|---|---|---|---|---|
| 9,854,206 | B1 * | 12/2017 | Ren | H04N 7/147 |
| 10,885,632 | B1 * | 1/2021 | Stahl | G06T 7/80 |
| 11,546,141 | B1 * | 1/2023 | Guest | H04L 9/0825 |
| 2019/0311298 | A1 * | 10/2019 | Kopp | G01C 25/00 |
| 2021/0073412 | A1 * | 3/2021 | Kvochko | G06T 1/0021 |
| 2022/0207181 | A1 * | 6/2022 | Ng | A63F 13/35 |
| 2022/0414264 | A1 * | 12/2022 | Ananthanarayanan | H04L 67/12 |

FOREIGN PATENT DOCUMENTS

CN          111859451 B   *   2/2024   .........   G06F 21/6245

\* cited by examiner

*Primary Examiner* — Mohammed Waliullah
(74) *Attorney, Agent, or Firm* — GREENBERG TRAURIG LLP

(57) ABSTRACT

Systems and methods for automatic redaction of sensitive information from video streams are disclosed. According to one embodiment, a method for automatic redaction of sensitive information from video streams may include: (1) receiving, by an image processing computer program executed by an electronic device, a video stream of an area; (2) identifying, by the image processing computer program, an object capable of having sensitive information thereon in the video stream of the area; and (3) redacting or obscuring, by the image processing computer program, the object in the video stream.

5 Claims, 2 Drawing Sheets

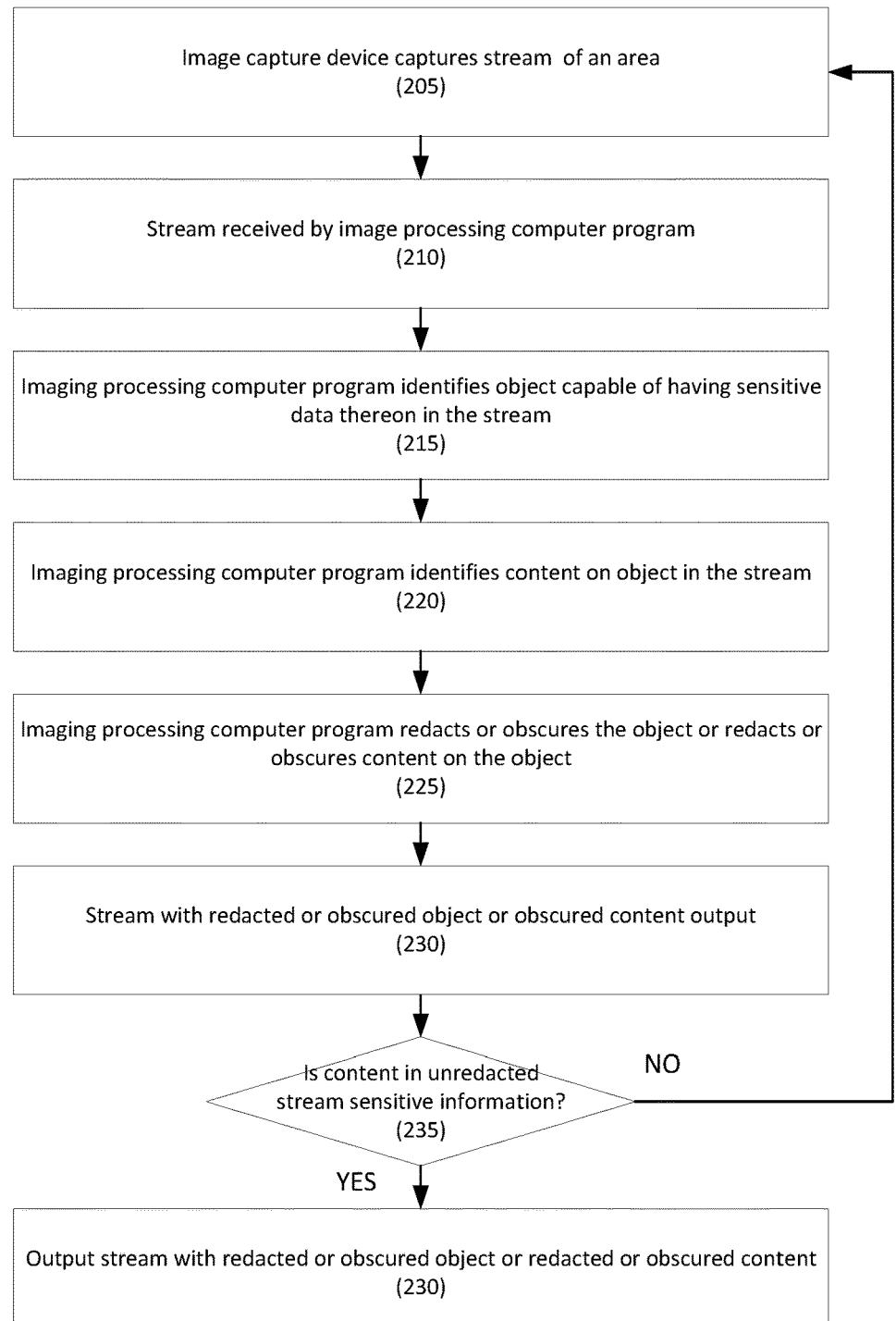

Image capture device captures stream of an area
(205)

Stream received by image processing computer program
(210)

Imaging processing computer program identifies object capable of having sensitive data thereon in the stream
(215)

Imaging processing computer program identifies content on object in the stream
(220)

Imaging processing computer program redacts or obscures the object or redacts or obscures content on the object
(225)

Stream with redacted or obscured object or obscured content output
(230)

Is content in unredacted stream sensitive information?
(235)

NO

YES

Output stream with redacted or obscured object or redacted or obscured content
(230)

FIGURE 2

SYSTEMS AND METHODS FOR AUTOMATIC REDACTION OF SENSITIVE INFORMATION FROM VIDEO STREAMS

BACKGROUND OF THE INVENTION

1. Field of the Invention

Embodiments relate generally to systems and methods for automatic redaction of sensitive information from video streams.

2. Description of the Related Art

Video-capable devices, be it Internet of Things (IoT) equipment or augmented reality (AR)/virtual reality (VR) gadgets, are becoming increasingly more prevalent in modern business environments. They greatly help with the operation (e.g., communication, safety, etc.) of the businesses, but could also pose potential threats in capturing and leaking sensitive business information, either inadvertently or via malicious means. For example, a surveillance camera installed near a conference room may have a whiteboard that could have sensitive business information written on it in its field of view. This puts the sensitive information at risk.

Existing video redaction solutions in the marketplace use offline processing on recorded video files, which has the potential of leaking sensitive information from the original video.

SUMMARY OF THE INVENTION

Systems and methods for automatic redaction of sensitive information from video streams are disclosed. According to one embodiment, a method for automatic redaction of sensitive information from video streams may include: (1) receiving, by an image processing computer program executed by an electronic device, a video stream of an area; (2) identifying, by the image processing computer program, an object capable of having sensitive information thereon in the video stream of the area; and (3) redacting or obscuring, by the image processing computer program, the object in the video stream.

In one embodiment, the step of identifying the object of interest capable of having sensitive information thereon in the video stream of the area may include: accessing, by the image processing computer program, a database comprising an architectural definition of the area, wherein the architectural definition may include known locations of known objects; and matching a location of the object to one of the known locations.

In one embodiment, the step of identifying the object of interest capable of having sensitive information thereon in the video stream of the area may include: accessing, by the image processing computer program, a database of known objects; and matching the object to one of the known objects.

In one embodiment, the image processing computer program may identify the object based on a label provided on the object, such as a QR label, a RF tag, and/or an IR tag.

In one embodiment, the method may also include identifying, by the image processing computer program, content on the object, wherein the image processing computer program redacts or obscures the content on the object in the video stream.

In one embodiment, the method may also include determining, by the image processing computer program, that the content is sensitive information by recognizing character data in the content using optical character recognition and matching, by the image processing computer program, the character data to sensitive character data in a sensitive information database, wherein the image processing computer program redacts or obscures the sensitive information on the object in the video stream.

In one embodiment, the sensitive information may include business confidential information and/or personal identifiable information.

In one embodiment, the object may include a board, a display, a document, a desk, and/or a table.

According to another embodiment, a system for automatic redaction of sensitive information from video streams may include an image capture device that captures a video stream of an area, and an electronic device comprising a memory storing an image processing computer program and a computer processor, wherein the image processing computer program receives the video stream from the image capture device, identifies an object capable of having sensitive information thereon in the video stream of the area, and redacts or obscures the object in the video stream.

In one embodiment, the system may also include a database comprising an architectural definition for the area comprising known locations for known objects in the area, wherein the image processing computer program may identify the object of interest by matching a location of the object to a known in the architectural definition for the area.

In one embodiment, the object of interest may include a label such as a QR label, a RF tag, or an IR tag, and the image processing computer program identifies the object of interest based on the label.

In one embodiment, the system may also include a database comprising known objects of interest, wherein the image processing computer program identifies the object of interest by matching the object of interest to a known object of interest in the database.

In one embodiment, the image processing computer program may also identify content on the object, and redacts or obscures the content on the object in the video stream.

In one embodiment, the system may also include a sensitive information database, wherein the image processing computer program may determine that the content is sensitive information by recognizing, character data in the content using optical character recognition, matching the character data to sensitive character data in a sensitive information database, and redacting or obscuring the sensitive information on the object in the video stream.

In one embodiment, the sensitive information may include business confidential information and/or personal identifiable information.

In one embodiment, the object of interest may include a board, a display, a document, a desk, and/or a table.

In one embodiment, the image capture device and the electronic device may be the same device. The electronic device may include a cloud-based electronic device.

In one embodiment, portions of the image processing computer program may be executed by different electronic devices.

In one embodiment, the system may also include object storage or block storage, and the video stream with redactions may be stored in the object storage or block storage.

BRIEF DESCRIPTION OF THE DRAWINGS

In order to facilitate a fuller understanding of the present invention, reference is now made to the attached drawings.

The drawings should not be construed as limiting the present invention but are intended only to illustrate different aspects and embodiments.

FIG. 2 depicts a method for automatic redaction of sensitive information from video streams according to an embodiment.

DETAILED DESCRIPTION OF PREFERRED EMBODIMENTS

Figure 1:
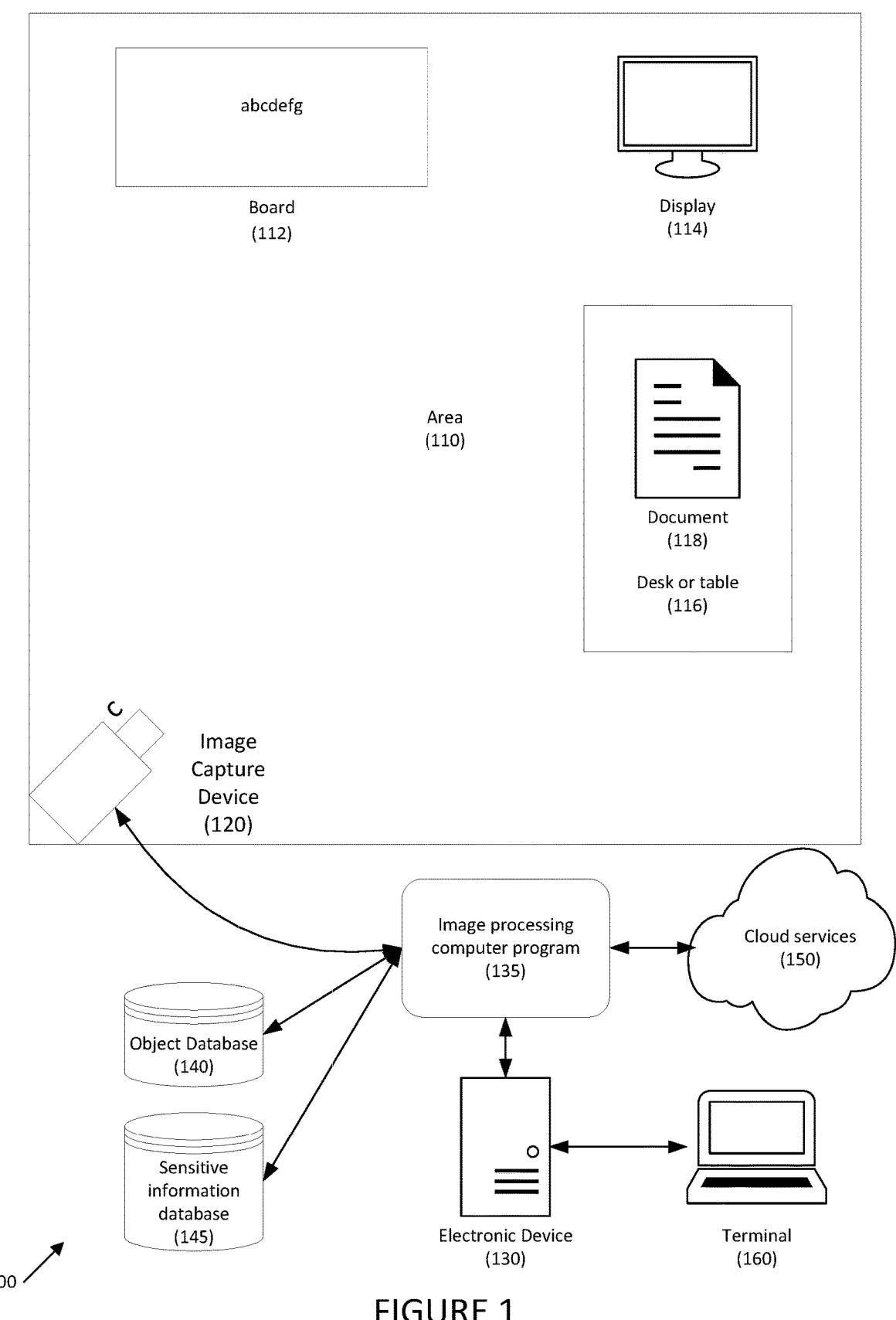
FIG. 1 is a depicts a system for automatic redaction of sensitive information from video streams according to an embodiment.

Embodiments relate generally to systems and methods for automatic redaction of sensitive information from video streams.

For example, embodiments may use computer vision-based techniques that are implemented as middleware for the video capture devices. The middleware thus acts as a filter layer for the video streams that may manipulate and/or redact areas that contain potentially sensitive information. The middleware may be configured to manipulate or redact the potentially sensitive information according to the requirements of the deploying businesses. For example, embodiments may provide custom definition capabilities for sensitive areas and the method for redaction of manipulation.

For example, sensitive areas may be specified by object-based definitions, such as "whiteboards," "computer screens," "notepads," etc. In embodiments, computer vision-based object detection models may be loaded into the video pipeline to detect the presence of sensitive objects in the video stream, and may insert masking information.

Other techniques may be used instead or, or in addition to, object detection models, may be used to define sensitive areas, such as by placing QR tags or other machine-detectable tags at the corners of intended sensitive areas. These tags may be identified by reading devices.

In one embodiment, RF tags may be place on or near the sensitive areas.

Once a sensitive area is detected and the information to be masked is identified, the subsequent manipulation/redaction operations to carry out may be selected. For example, certain messages may be overlaid on the masked sensitive area to warn potential offline/real time viewers about the sensitive areas. As another example, random noise, irrelevant random information, etc. may be blended in the masked area. This selection may be based on usage scenarios, for example, security surveillance versus touring for candidates.

Referring to FIG. 1, a system for automatic redaction of sensitive information from video streams is disclosed according to an embodiment. System 100 may include area 110 which may be any suitable area in which sensitive information may be present, including offices, conference rooms, workspaces, hallways, etc. Sensitive information may include any information that may be considered to be sensitive, including business confidential information (e.g., roadmaps, trade secrets, ideation, products, customer lists, legal information, human resources information, etc.), personal identifiable information (PII), personal beliefs, group membership data, genetic or biometric data used for identification purposes, health-related data, etc.

Area 110 may include one or more object that may present sensitive information, including board 112 (e.g., a whiteboard, blackboard, bulletin board, etc.), display 114, document 118 or desk or table 116, etc. Other objects on which sensitive information may be presented may be provided as is necessary and/or desired.

Area 110 may further include one or more image capture device 120, such as a web camera, a security camera, a video conference camera, etc. Image capture device 120 may be present within area 110, or it may be external to area 110 but still have at least a portion of area 110 within its field of view.

System 100 may further include electronic device 130 which may be any suitable computing device, including servers (e.g., physical and/or cloud-based), workstations, computers (e.g., desktop, laptop, notebook, tablet, etc.), Internet of Things appliances, etc. In one embodiment, electronic device 130 may execute image processing computer program 135 that may receive a stream including one or more images from image capture device 120 and may process the image(s) to identify objects that may contain sensitive data (e.g., board 112, display 114, desk or table 116, document 118, etc.).

System 100 may further include one or more database, such as object database 140, sensitive information database 145, etc. Databases 140 and 145 may be internal and/or external databases, including cloud-based databases. In one embodiment, object database 140 may store information used by image processing computer program 135 to identify objects that may present sensitive information, such as board 112, display 114, desk or table 116, document 118, etc. Object database 140 may use publicly available definitions to identify the objects; in another embodiment, object database 140 may include custom definitions. Object database 140 may further include dimensions of known objects of interest.

In one embodiment, object recognition with deep learning may be used to train an algorithm to distinguish among image classification, object localization, and object detection. Image classification involves predicting the class of one object in an image. Object localization refers to identifying the location of one or more objects in an image and drawing abounding box around their extent. Object detection combines these two tasks and localizes and classifies one or more objects in an image. Embodiments may use deep neural network models to detect and label objects in the stream.

Embodiments may use cloud services 150, such as cloud-based machine learning services. Examples of such services include Amazon Rekognition™, Microsoft Azure Computer Vision API, Google Cloud Vision API, etc., open source services, etc. Cloud services 150 may be provided by a third party, or they may be internal services.

In one embodiment, object database 140 may include locations of fixed objects, such as board 112, display 114, desk or table 116, etc. In one embodiment, image processing computer program 135 may be programmed with the locations of fixed objects so that it does not have to recognize the fixed objects in the received stream.

In one embodiment, one or more object (e.g., board 112, display 114, desk or table 116, document 118, etc.) may have an identifier affixed thereon, such as a machine-readable label (e.g., QR label), RF tag, IR tag, etc. In one embodiment, the identifier may identify the type of object, the dimensions of the object, etc. Any other suitable identifier may be used as is necessary and/or desired. Image processing computer program 135 may be programmed to identify the object based on the identifier.

System 100 may further include terminal 160, which may be any suitable electronic device that may receive, display, and/or store the redacted stream. In one embodiment, terminal 160 may execute at least some of image processing computer program 135, and may redact information from identified objects as is necessary and/or desired.

In one embodiment, functionality of image processing computer program 135 may be provided on electronic device 130, cloud services 150, and/or terminal 160.

Referring to FIG. 2, a method for automatic redaction of sensitive information from video streams is disclosed according to an embodiment.

In step 205, an image capture device may capture a stream, such as a video stream, including one or more images of an area. In one embodiment, the data may be streamed from the image capture device over, for example, Transmission Control Protocol (TCP) or User Datagram Protocol (UDP), and may use protocols such as Real-Time Streaming Protocol (RTSP). The stream may be encrypted in transport.

In step 210, the stream may be received by an image processing computer program executed by an electronic device. In one embodiment, the image processing computer program may be provided at or in the image capture device (e.g., edge computing). For example, the image processing computer program may be installed directly on the image capture device.

In another embodiment, the image processing computer program may be provided on an electronic device that is separate from the image capture device, such as physical server, cloud-based server, etc. In another embodiment, the image processing computer program may be provided on a destination device, such as a terminal (e.g., a desktop, laptop, tablet computer, smart phone, etc.).

The image processing computer program may intercept the stream by, for example, proxying the RTSP stream using a Simple RTSP proxy.

In step 215, the imaging processing computer program may identify one or more objects in the stream. For example, the image processing computer program may identify objects based on location, dimensions, identifiers (e.g., machine-readable labels, such as a QR label, a RF tag, an IR tag, etc.). In one embodiment, the image processing computer program may access a database of object definitions that may be used to identify the objects. The database may further identify locations of the objects.

In one embodiment, the image processing computer program may communicate with cloud services, such as internal and/or external cloud-based machine learning services, to identify the object(s) in the stream.

In one embodiment, the image processing computer program may be programmed with locations for fixed objects so that it automatically recognizes the fixed objects. For example, the locations may be in an architectural definition file for the area. The architectural definition for the area may include known locations for known objects in the area.

In optional step 220, the imaging processing computer program may identify content on one or more object in the stream. For example, the image processing computer program may identify handwriting, diagrams, text, etc. that may be present on one or more of the objects.

In step 225, the imaging processing computer program may redact or obscure the content on the object(s) in the stream. For example, the imaging processing computer program may cover the content with an object (e.g., a black or white box, company logo, etc.), may pixelate the content, may delete the content and/or the object from the stream, may include a watermark to obscure or hide the content, etc.

In another embodiment, the imaging processing computer program may redact or obscure the object(s) without identifying content.

In step 230, the imaging processing computer program may output the stream with the redacted or obscured content. In one embodiment, the stream with the redacted or obscured content may be output to any suitable electronic device (e.g., computer, smart phone, etc.), or it may be stored in object storage, block storage, or at any suitable storage location for future retrieval.

In optional step 235, the image processing computer program may determine whether the content in an unredacted stream is sensitive or not. Because it may be a compute intensive operation, the sensitive information determination may be performed on stored streams. In one embodiment, the image processing computer program may perform optical character recognition (OCR) on the contents. The converted text may be matched against data in a sensitive information database to determine whether the content is sensitive.

In one embodiment, a trained machine learning engine may be used to determine whether the converted text is sensitive.

If the content is determined to be sensitive information, the sensitive information may be redacted. If the content is determined to not be sensitive information, the content may remain unredacted.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, cloud services, etc. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automatic redaction of sensitive information from video streams, comprising:

receiving, by an image processing computer program executed by an electronic device, a video stream of an office, a conference room, or a workspace;

accessing, by the image processing computer program, a database comprising known locations of known fixed objects within the office, the conference room, or the workspace that are capable of having sensitive information thereon, wherein the known fixed objects consist of a whiteboard, a blackboard, a display, a desk, or a table;

identifying, by the image processing computer program and using a deep neural network model, an object capable of having sensitive information thereon in the video stream of the office, the conference room, or the workspace, wherein the sensitive information comprises text or image data;

matching, by the image processing computer program, a location of the object to one of the known locations of the known fixed objects within the office, the conference room, or the workspace; and redacting or obscuring, by the image processing computer program, the object in the video stream in response to the location of the object matching one of the known locations.

2. The method of claim 1, further comprising:

identifying, by the image processing computer program, content on the object;

wherein the image processing computer program redacts or obscures the content on the object in the video stream.

3. The method of claim 2, further comprising:

determining, by the image processing computer program, that the content is sensitive information by recognizing character data in the content using optical character recognition and matching, by the image processing computer program, the character data to sensitive character data in a sensitive information database;

wherein the image processing computer program redacts or obscures the sensitive information on the object in the video stream.

4. The method of claim 1, wherein the sensitive information comprises business confidential information and/or personal identifiable information.

5. The method of claim 1, wherein the video stream is received from a fixed image capture device.

* * * * *